(12) United States Patent
Lanitz

(10) Patent No.: US 9,764,817 B2
(45) Date of Patent: Sep. 19, 2017

(54) METHOD FOR COVERING LIGHT AIRCRAFT

(76) Inventor: Siegfried Lanitz, Leipzig (DE)

( * ) Notice: Subject to any disclaimer, the term of this patent is extended or adjusted under 35 U.S.C. 154(b) by 983 days.

(21) Appl. No.: 13/119,198

(22) PCT Filed: Sep. 15, 2009

(86) PCT No.: PCT/EP2009/006923
§ 371 (c)(1),
(2), (4) Date: Aug. 1, 2011

(87) PCT Pub. No.: WO2010/031591
PCT Pub. Date: Mar. 25, 2010

(65) Prior Publication Data
US 2011/0272525 A1    Nov. 10, 2011

(30) Foreign Application Priority Data
Sep. 18, 2008   (DE) .................... 10 2008 048 400

(51) Int. Cl.
| | |
|---|---|
| *B64C 1/12* | (2006.01) |
| *A63H 27/00* | (2006.01) |
| *B64C 3/26* | (2006.01) |
| *C08G 18/50* | (2006.01) |
| *C09J 5/06* | (2006.01) |
| *C09J 175/08* | (2006.01) |

(52) U.S. Cl.
CPC .............. *B64C 1/12* (2013.01); *A63H 27/02* (2013.01); *B64C 3/26* (2013.01); *C08G 18/5024* (2013.01); *C09J 5/06* (2013.01); *C09J 175/08* (2013.01); *C08G 2170/20* (2013.01); *C08G 2170/80* (2013.01); *C09J 2400/263* (2013.01)

(58) Field of Classification Search
CPC .................................... B64C 1/12; B64C 3/26
USPC ............ 244/132, 133, 153 R, 154, 900, 901; 428/34.9
See application file for complete search history.

(56) References Cited

U.S. PATENT DOCUMENTS

| | | |
|---|---|---|
| 3,841,942 A | 10/1974 | Carlson et al. |
| 4,095,760 A * | 6/1978 | Sommer et al. ........... 244/123.1 |
| 4,225,372 A | 9/1980 | Kinzler et al. |
| 4,997,688 A | 3/1991 | Hardman |
| 6,548,428 B1 | 4/2003 | Lanitz et al. |

(Continued)

FOREIGN PATENT DOCUMENTS

| | | |
|---|---|---|
| DE | 849 051 | 9/1952 |
| DE | 44 39 031 A1 | 5/1996 |
| EP | 1 288 124 A1 | 3/2003 |

(Continued)

OTHER PUBLICATIONS

Desmocoll 540 MSDS, Feb. 2008.

(Continued)

*Primary Examiner* — Brian M O'Hara
(74) *Attorney, Agent, or Firm* — Agris & Von Natzmer, LLP; Joyce Von Natzmer

(57) ABSTRACT

The invention relates to a method for covering light aircraft and/or parts thereof with a polyester covering fabric, and to a dispersion hot-melt adhesive and to the use thereof for covering. The invention further relates to a light aircraft or to a part of the same which is covered with a polyester covering fabric by means of the method according to the invention.

22 Claims, 3 Drawing Sheets

(56) References Cited

U.S. PATENT DOCUMENTS

2006/0084336 A1   4/2006  Howland et al.
2010/0120310 A1   5/2010  Lanitz

FOREIGN PATENT DOCUMENTS

| EP | 1 997 953 A1 | 12/2008 |
|---|---|---|
| GB | 2 215 746 A | 9/1989 |
| WO | 96/14208 A1 | 5/1996 |
| WO | 2008/138331 A1 | 11/2008 |

OTHER PUBLICATIONS

Bello et al., "Evaluation of the NIOSH draft method 5525 for determination of the total reactive isocyanate group (TRIG) for aliphatic isocyanates in autobody repair shops," Journal of Environmental Monitoring, Apr. 26, 2002, 4, 351-360.

Desmodur N 75 BA/X MSDS, Jun. 2010.

* cited by examiner

METHOD FOR COVERING LIGHT AIRCRAFT

This is the U.S. national stage of International application PCT/EP2009/006923, filed Sep. 15, 2009 designating the United States which claims priority to DE 10 2008 048 400.8, filed Sep. 18, 2008.

The invention relates to a method for covering light aircraft and/or parts thereof with a polyester fabric covering and also a dispersion hot-melt adhesive and its use to achieve the covering. Moreover, the invention relates to light aircraft or parts thereof that are covered with a polyester fabric covering, by using the method according to the invention.

Systems and materials for covering light aircraft, and/or model aircraft, are known in prior art. EP 0 737 132 B1, for example, describes a polyester fabric covering that can be handled easily and can be ironed, which comprises a polymerized multilayer system, which is applied to a polyester fabric that is especially developed as a fabric covering for light aircraft. Because the fabric is heat-treated at the end, it no longer requires to be varnished after having been applied. However, if this is desired for reasons of visual surface design, for example, the fabric can still be varnished without any problem.

The structures of the aircraft that are to be covered are very different and comprise such different materials as aluminum, steel, wood, glass fiber-reinforced plastic or carbon fiber-reinforced plastic. Accordingly, the processing conditions such as, for example, the temperature that is used for the fabric covering, vary widely. In the prior art, a disadvantage of the systems for covering light aircraft is that the procedure is very laborious. This means that the covering is put on with adhesive varnish that had previously been applied to the structure that is to be covered in several layers. The fabric covering is then saturated with solvents (for example, acetone) that soften the adhesive varnish. Subsequently, it is pressed into the softened adhesive varnish. After drying, the fabric covering is tautened with hot air.

Subsequently, approximately 5-10 coatings of stiffening varnish are applied, which must sometimes be interspersed with regrinding. Thereby, careful attention must be paid to make sure that no paint drips are formed. Aluminum powder is added to the last coat of stiffening varnish to achieve a UV block. Subsequently, 1-3 covering coats of varnish are applied. At the end, the object can then still be sealed with a clear varnish. In the case of all aircraft design, this work is associated with a significant expense of number of hours, and in the event of damage, it is not possible to simply iron out a piece, but the entire covering and varnishing process must be performed anew, also in the case of repair.

Based on this prior art, the present invention proposes the objective of providing a method with which light aircraft and/or parts thereof can be covered reliably, whereby the precision of the covering, its longevity and the cost of materials and thus the costs of the covering process remain the same for each structure and for each material characteristic of the light aircraft that is to be covered.

DESCRIPTION OF VARIOUS AND PREFERRED EMBODIMENTS

Figure 1:
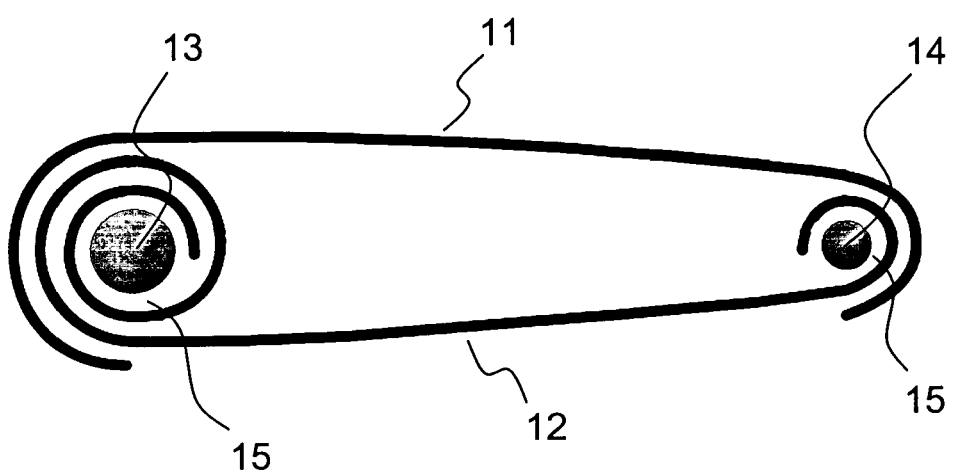
FIG. 1 shows how a nose spar (13) is covered by the underside (12) and upper side (11).

This problem is solved by the method according to the invention stated in the claims. Accordingly, in a first embodiment, the invention relates to a method for covering light aircraft and/or parts thereof, comprising a frame system, whereby the frame or parts of the frame are enclosed in a polyester fabric covering, whereby the fabric covering has a longitudinal shrinkage of 5-8%, preferably 7% and a horizontal shrinkage of 4-6%, preferably 5% at 160-180° C., comprising the following method steps, a) whereby the fabric covering, in the area of its overhang and parts of the frame, on which the covering fabric comes to lie, are painted with a dispersion hot-melt adhesive, whereby the adhesive contains a hardening component that polymerizes at a processing temperature >40° C., and b) whereby the fabric covering is wound around capping pieces of the frame in such a way that, when the connection between fabric covering and frame that is established by the adhesive disengages, the fabric covering is retained at the frame.

A light aircraft within the scope of the invention can comprise frame systems, for example, of wood, aluminum, steel, glass fiber-reinforced plastic or carbon fiber-reinforced plastic.

Parts of a light aircraft are, for example, its wings, empennages, nose spars, end spars, main spars, control spars, ribs, aileron or the fuselage.

Use of an air-permeable fabric covering is preferred, as it leads to particularly advantageous characteristics during flight.

By using the type of encasing according to the invention, the covering "automatically" pulls taut, even if the adhesive would disengage. Thereby, a slackening of the fabric covering is prevented. A potential fluttering of the fabric is precluded. The method thus leads to increased safety and is therefore advantageous compared to the methods in prior art.

The method for covering is preferably characterized thereby, that first the fabric covering is cut to measure in such a way that the form of the piece of fabric corresponds to the basic form of the part of the aircraft that is to be covered, whereby an overhang is left at each boundary line, which is used for subsequent fastening of the fabric on the aircraft part. Subsequently, the fabric covering is coated on its inside with a dispersion hot-melt adhesive in that section that is to be glued onto the structure of the aircraft. The structure is also coated with the dispersion hot-melt adhesive in the section that is to be covered. The dispersion hot-melt adhesive contains an integrated hardening component that is released at a relatively low temperature of 40° C. already, and lets the adhesive polymerize. Preferably, the adhesive polymerizes at temperatures of >40° C., especially preferred at 40-60° C. A relatively low processing temperature has the advantage that the method is gentler to the fabric covering and a more complete polymerization can be achieved.

The advantage of the dispersion adhesive of the invention is that it not only conglutinates when heat is applied, but also polymerizes, i.e. cross-links. As a result, a temperature-stable adhesion is created.

In the case of metal designs, all burrs should be ground off, if necessary, so that the fabric covering will not be damaged. Moreover, it has been shown to be advantageous when the metal surface is degreased prior to covering, as this leads to better adhesion of the adhesive.

In the case of aluminum designs, prior to applying the dispersion hot-melt adhesive, a temperature-stable adhesion varnish can be applied. In the case of steel designs, a temperature-stable primer can preferably be applied prior to covering.

Preferred is the method for covering light aircraft and/or parts, whereby the dispersion hot-melt adhesive includes 80-88% binding agent, 12-15% hardening component and 0.15-0.3% thickener.

The percentages indicated within the scope of the invention are percentages by weight.

Preferably, the binding agent includes a linear to a weakly branched polyurethane dispersion. Preferred is, moreover, a thickener based on polyurethane, particularly preferred, the thickener is non-ionogenic.

In an advantageous embodiment, the hardening component includes 54-60% solvent, 0.35-0.5% stabilizing agent on the basis of a sodium salt of naphthalene sulfonic acid, 0.25-0.35% emulsifier on the basis of a propoxylated alcohol, 1.7-1.9% hardening agent on the basis of a polyether amine and 37-41% polyisocyanate.

Preferably, water is used as solvent. The stabilizing agents on the basis of a sodium salt of naphthalene sulfonic acid can, for example, be Tamol NN 4501. Emulsifier FD can be used as emulsifier. The hardening agent on the basis of a polyether amine can be Jeffamine T403, for example. An aliphatic polyisocyanate, for example, Desmodur LPBUEJ471 is preferred.

It is advantageous that the underside of the aircraft part is covered with fabric first, by first winding the part of the fabric covering that is coated with the adhesive around the anterior end located in flight direction and ironing this part on with a suitable tool. Then, the posterior end of the aircraft part is surrounded with that part of the fabric covering that is—just like in the case of the anterior part—coated with adhesive. Subsequently, this part is ironed on in the same way as the anterior end.

As a next step, the upper side of the aircraft part is covered with fabric, once again starting at the anterior end located in flight direction, around which that part of the fabric covering is wound that has been coated with adhesive, after which the fabric covering is ironed on, while here too, the posterior end of the aircraft part is subsequently likewise surrounded with that part of the fabric covering that has been coated with adhesive, and the fabric covering is ironed on in the same way.

In a further embodiment, the invention relates to the method for covering light aircraft and/or parts thereof, characterized by, that
 a) for covering the structural elements of the aircraft, the fabric covering is cut to measure in such a way that the overhang (A) of the cutting edge toward the nose spar of the structural element that is to be covered is $(A=\pi \cdot d \cdot x)$ and $(A=\pi \cdot d \cdot y)$ from the end spar of the same structural element, whereby the d is the diameter of the pipe that is to be surrounded by the fabric covering (in cm) and x=1.5 to 2.0, preferably 1.75 and y=0.55 to 1.05, preferably 0.8, and
 b) the lower side of the structural element is covered with fabric by surrounding the nose spar with the fabric covering that has been coated with adhesive approximately 1.75 times (550° to 700°), and this part is ironed on and subsequently, the end spar approximately 0.75 times (200° bis 350°), of the part of the fabric covering that is likewise coated with adhesive, and this part is likewise ironed on in the same way, followed by
 c) covering the upper side of the structural element with fabric by surrounding the nose spar approximately 0.5 times (150° to 210°) with the part of the fabric covering that has been coated with adhesive, and the fabric covering is ironed on, while the end spar is subsequently surrounded less than 0.5 times (120° to 170°) with the part of the covering fabric that is likewise coated with adhesive, and the fabric covering is ironed on in the same way.

Due to this kind of winding around, the covering "automatically" draws tight and thereby guarantees purchase even if the adhesive were to disengage. As a result, a high degree of security and durability is guaranteed.

Preferably, at first the upper side of the structural element is covered with fabric. For this, first the nose spar is surrounded 0.5 times (150° to 210°, preferably 180°) with the fabric covering, whereby the surrounding part is coated with adhesive just as in the case of covering the underside. Subsequently, the covering fabric is ironed on, while the end spar is subsequently surrounded less than 0.5 times (150° to 210°, preferably 180°) with the covering fabric that is likewise coated with adhesive and the covering is ironed on in the same way. This number of windings advantageously ensures a high degree of stability of the covering without thereby negatively influencing the aerodynamic behavior of the covered aircraft parts due to local thickenings.

In a further preferred embodiment of the method according to the invention, when the lateral structural units are covered, the left side is covered with fabric first and when the right side is covered with fabric, the covering fabric is wound around less than 0.5 times (110° to 160°, preferably 144°) around the nose spar and the end spar, whereby the overlap at the spars does not project into the air flow. This embodiment ensures robust covering even for lateral structural units, which withstands the sometimes significant mechanical load that is induced upon these components by the air current.

In a further preferred embodiment of the method according to the invention, the contact surfaces between the covering fabric and the undercarriage are first coated with the dispersion hot-melt adhesive when covering the fuselage and subsequently, preferably in the sequence of underside, right side, left side, upper side, the fuselage is covered with fabric. Adhering to this sequence ensures that even those positions that are difficult to access can be processed easily. Advantageously, covering the fuselage comprises as few individual parts as possible, as this reduces the number of joints and seams.

In a further preferred embodiment of the method according to the invention, prior to ironing the covering onto the right fuselage to which the fuselage structure has already been transferred and adhesive applied, the left fuselage covering is fixated at the fuselage. As a result of these processes, the fuselage structure can be transferred to the inner side of the covering, where then the adhesive can already be applied, which makes an exact and uniform application of the fabric covering possible on both sides of the fuselage.

In a preferred embodiment, the covering fabric is subsequently shrunk by being heated once or twice using hot air blowers at a temperature setting of 280° C. to 380° C., preferably 350° C. to approximately 200° C., whereby the actual temperature at the fabric is controlled by the distance from the blower. Preferably, the covering process is completed with this thermo-induced shrinking of the fabric covering. Where no shrinking is required, the fabric is merely ironed on, so that it is fastened by the polymerized adhesive. By using this method, wrinkles are removed for one, and for another, shrinking makes the film sturdy. This method saves significant time and is environmentally friendly, as no solvents are used. Further, the weight gain of the aircraft is 10-20 kg lower as a result of this covering than with conventional covering technology.

In a further embodiment, patches are likewise coated with the dispersion hot-melt adhesive prior to the covering process and after the adhesive has dried, they are ironed onto rivets and gusset plates to protect the fabric covering. Within the scope of the invention, patches are small additional pieces of the covering fabric. Advantageously, the use of patches protects the fabric covering from damage due to chafing at such sharp-edged sections. As a result, longer durability and an increased degree of safety are guaranteed.

In a further preferred embodiment, ironing the covering fabric and/or patches onto wood designs is done at a temperature of 70° C. to 110° C. A temperature of 90° C. is especially advantageous. In the case of metal designs, ironing on the covering fabric and/or patches preferably occurs at a temperature of approximately 130° C. to 170° C. In this way it is ensured that the dispersion hot-melt adhesive hardens without already shrinking the fabric covering. As metals are fundamentally good heat conductors and thus draw off a high degree of heat relatively quickly, somewhat higher temperatures can be used in this case.

Moreover, preferably, the method is characterized thereby, that required seams are sealed with a lobed band made of covering fabric, which is coated with a dispersion hot-melt adhesive according to one of the preceding claims, and is subsequently ironed onto the seam at 60° C. to 100° C., preferably 90° C. Preferably, the seams are coated with dispersion hot-melt adhesive at 4 mm depth under the lobed band. The sealing significantly increases the robustness and durability of the seams and thus of the entire covering. Beyond that, the surface of the fuselage and the wings are thus protected against the penetration of moisture. Whether a covering must be sewed together depends on the configuration of the structural design.

In a further preferred embodiment of the method according to the invention, an inscription, optionally applied to the covered surfaces, is made of polyester color film by means of cold adhesion and subsequent ironing at 80° C. Preferably, the polyester color film is dimension-stable, temperature-resistant and/or fuel-resistant. The durable and individual finish of the aircraft surface that is achieved in this way can be applied easily, whereby the cold adhesion prevents an undesired deformation of the covering that is present.

In a further preferred embodiment, the invention relates to a dispersion hot-melt adhesive including dispersion hot-melt adhesive 80-88% binding agent, 12-15% hardening component 0.15-0.3% thickener, whereby the adhesive polymerizes at temperatures of >40° C.

Preferably, the binding agent includes a linear to weakly branched polyurethane dispersion. Moreover, a thickener on the basis of polyurethane is preferred, particularly preferred, the thickener is non-ionogenic.

Further, a dispersion hot-melt adhesive is preferred, whereby the hardener component includes 54-60% solvent, 0.35-0.5% stabilizing agent on the basis of a sodium salt of naphthalene sulfonic acid, 0.25-0.35% emulsifier on the basis of a propoxylated alcohol, 1.7-1.9% hardener on the basis of a polyether amine, 37-41% polyisocyanate.

Preferably, water is used as solvent. The stabilizing agent on the basis of a sodium salt of naphthalene sulfonic acid can be Tamol NN 4501, for example. As emulsifier, Emulsifier FD can be used. The hardener on the basis of a polyether amine can be Jeffamine T403, for example. An aliphatic polyisocyanate, for example, Desmodur LPBUEJ471 is preferred.

The adhesive in accordance with the invention is particularly advantageous for use in the method according to the invention, as the adhesive is temperature-stable, and therefore does not dissolve when the covering fabric is ironed. The adhesive is well suited for all light aircraft and differentiates itself by an especially good durability.

In a further embodiment, the invention relates to use the of a dispersion hot-melt adhesive according to the invention for covering light aircraft and/or parts thereof.

A further embodiment of the invention relates to a light aircraft or a part of such, characterized by, that it is covered with a polyester fabric covering using the method according to the invention.

EXAMPLES

Exemplary Embodiment 1

Covering the Structural Elements

After the structural element is positioned, the entire frame structure is circled with a pencil on the inner side and the outer side of the structure, so that the complete contour of the structural element is transferred to the inner side of the fabric covering. At this time, the transfers are made for the upper side and for the underside. The underside is that side, which is covered first, and for which the nose spar is covered with fabric to 630° (FIG. 1).

After ironing on, the first 270° of the inner enclosure of the fabric receives an additional coating of adhesive on the outer side, in order to ensure an optimal conglutination. In order to draw the cut line for the structural element, an additional second line is drawn as outer cut line. The distance from this cut line to the base line is generally calculated for the nose spar by using the following formula:
Example: diameter (nose spar)=5 cm $$\pi \cdot d \text{ (cm)} \cdot 1.75 = 3.14 \cdot 5 \text{ cm} \cdot 1.75 = 27.5 \text{ cm}$$

The addition for the anterior cutting edge is accordingly 17.5 cm.

The following formula applies to the fabric addition at the end spar:
Example: diameter (end spar)=2 cm $$\pi \cdot d \text{ (cm)} \cdot 0.8 = 3.14 \cdot 2 \text{ cm} \cdot 0.8 = 5 \text{ cm}$$

Accordingly, the addition for the posterior cutting edge is 5 cm.

The area that is marked on the fabric from the outer cutting line up to the line of the posterior end of the spar, as well as the sections that are covered by bars and booms, are now coated with dispersion hot-melt adhesive. After the adhesive is dry, the fabric is cut. Where the fabric enclosure has bars or ribs, a cut is made into the section of the bars and ribs. The strips created by these cuts can be ironed onto the rib or the bar as "patch".

Figure 2:
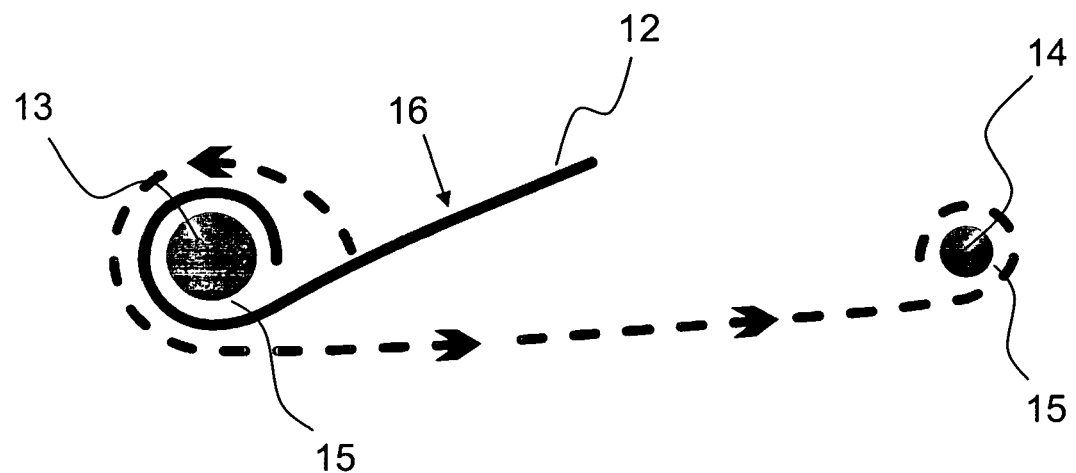
FIG. 2 shows a covering process of a nose spar (13) and an end spar (14).

The covering process starts at the nose spar and is then continued to the end spar. To do so, the covering fabric surrounds the nose spar by almost 360°(FIG. 2). Now, the ironing of the fabric onto the inner sides of the nose spar can be started. For the sake of simplicity, this process is always started at straight spars. The tapers are covered only after the fabric has been fixed to the end spar. The fabric is wound around the nose spar of the structure that is to be covered and ironed on (FIG. 2). In the section of the tapers, the surrounding at the nose spar is, if necessary, reduced to 270°. Curves, such as tips are ironed on with the iron. As the fabric can easily be stretched because of the heat, it must be pulled around the structure with the other hand during ironing. Wrinkles that occur are shrunk away by means of the increased heat.

In the section of the end spar, the fabric is ironed on at an angle of approximately 270° in order to have an anchor surface that is as large as possible. Even around the other outer pipes, ironing is done to 270°. When the upper side is ironed on, ironing of the outer structure is done by surrounding the spars by 180°. With the exception of the lateral structural unit, just like with the altitude control, wing and all openings, the "underside" is covered first.

To prevent that the fabric adheres to fabric when the pipe structure is ironed, silicon paper is put on the inner side of the surface of the pipe that is to be ironed, in addition to the structure transfer.

Now, the lateral structural element is prepared for covering. To do so, it is positioned on the inner side of the fabric and encircled by a circle in the outer section. The distance of the circular marking to the pipe is, for the first side that is to be covered, the pipe circumference +75% at the nose pipe, and 80% of the pipe circumference at the end pipe. For the opposite side, it is approximately 40% of the pipe circumference. Then, the lateral empennage is rotated and the opposite side is drawn. Subsequently, the two lateral structural element coverings are coated with adhesive, whereby the circular marking represents the outer limit of the adhesive coat. Care is to be taken that all sections of the fabric that abut the structure are coated with adhesive in order to ensure a secure, firm fit. After drying, it is cut with an excess of approximately 10-15 cm along the outer line of the circle. Ironing is done according to the method that has been described.

After the part that abuts directly on the pipe is ironed on, dispersion hot-melt adhesive is applied in that section in which fabric layer lies upon fabric layer. After drying, the outer side is ironed on. The covering is ironed around the pipe structure for 180°, and at the end pipe, it is ironed surrounding 280°. Folds that occur in curved sections can be shrunk away with heat. In the event not all wrinkles disappear, subsequent shrinking is done with the hot air blower and at a higher temperature, until the folds have disappeared. When doing this work, the fabric must be retained for a moment after the hot air blower is removed, so that the adhesive can cool down and anchor the fabric on the substrate.

Wrinkles that are still present after the covering has been ironed are removed with a hot air blower at a temperature setting of 350° C. The temperature of the air impinging on the fabric is "controlled" by the distance from the fabric: the greater the distance, the colder the temperature load. To control shrinking, the surface temperature is measured with an infrared thermometer. It should not exceed 200°. To prevent burns to fingers while pressing the fabric onto the structure, it is best to use a felt coating knife. In order to iron the upper side cleanly onto the underside, points are marked in the middle of the pipe on the lateral structural unit. The fabric is cut to measure and ironed on corresponding to the marking.

In curved sections, unevenness of the upper side is ironed away with higher levels of heat and shrunk away. At straight seam positions, at which no shrinking is required, ironing is done at approximately 90-100° C. (wood constructions). In the case of metal construction, due to the high degree of conductivity, temperatures of 130 to 170° C. can be appropriate. To achieve clean transitions, support lines, which serve as cutting edge, are always drawn using a circle. The inner support line is used to ensure that adhesive is only applied in the section in which it is needed.

To prevent fabric displacements, it is placed around the structure and fixated with adhesive tape. After the fabric has been cut to measure, it is ironed on. At radii such as tips, the fabric is ironed on at higher levels of heat and contracted tightly.

The inscription can be made with a special film that is ironed on at approximately 80° C. subsequent to a cold adhesion.

Exemplary Embodiment 2

Covering the Wings

The wings are covered using a method analogous to the technique that was explained for the structural units. First, the structure of the wing is transferred to the inner side of the fabric. The complete structure of the upper side and the underside of the wing is conveniently transferred onto the rolled out fabric. It is then coated with adhesive in the marked area. Parallel to that, a strip is coated with adhesive, which is subsequently cut, whereby the patches that are obtained in the process are applied at all rivet positions, for example, over the rib cap strip. All patches that have been applied are then coated with adhesive on the upper side. After the adhesive has dried, first the underside, then the upper side of the wings is covered. While covering, it is advantageous to start at the nose spar and thereby surround the nose spar with covering. At those positions at which fabric lies upon fabric, dispersion hot-melt adhesive is applied. After drying, the fabric is pulled taut toward the end spar, and it is likewise ironed on there. The surrounding of the end spar should be at least 270°. After the conclusion of this work, the wing is turned around and the upper side of the wing is covered as has already been described. Thereby, care must be taken that especially in the case of obstacles, the ironing is performed carefully. At the radix rib and at the tip, the fabric is ironed cleanly around or into the radix rib, in order to obtain a maximum anchor surface for the adhesive and the fabric. Apertures are secured with a reinforcement patch that is to be applied on the inner side and on the outer side. After completing the ironing process, remaining wrinkles at the pipe are shrunk away at higher levels of heat with the hot air blower. When the hot air blower is used for shrinking, it is recommended to cover the seams with a strip made of corrugated card board, so that the adhesive does not soften again due to the high temperature, and the fabric "pulls away" during shrinking. As not all positions are uniformly impinged by heat during shrinking, this process is to be repeated one to two times. Overlaps are to be at least 5 cm wide (nose spar, end spar).

Exemplary Embodiment 3

Covering the Fuselage

Figure 3:
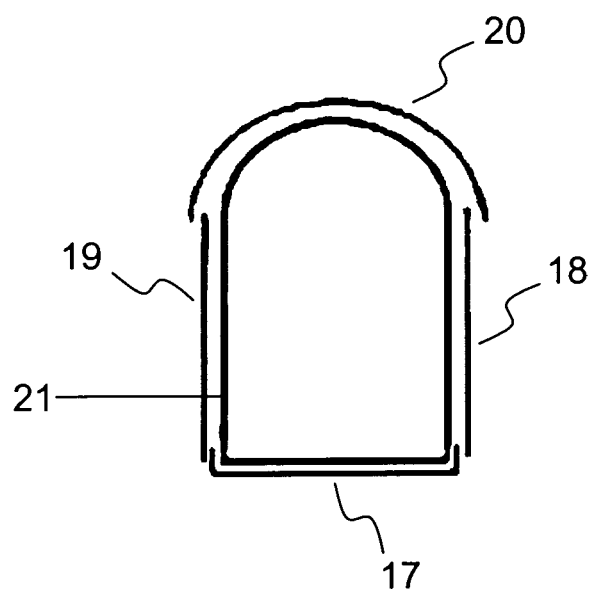
FIG. 3 shows how a fuselage (21) is covered.

The fuselage is covered analogous to the wing. The approach corresponds to the covering diagram as per to FIG. 3. Covering the fuselage can be started either with the fuselage itself or peripherally with the undercarriage. A rough cut to measure of the fabric is fixated to the underside of the undercarriage, for example, with masking tape, and all contact surfaces of the undercarriage and the fabric are marked. Even the outer cut lines are drawn in, whereby the pipe should be surrounded with fabric up to an angle of 270°. All contact positions, i.e. those of the fabric as well as those of the undercarriage, are coated with dispersion hot-melt adhesive. Advantageously, the covering process starts at the underside of the undercarriage. As has already been described in Section 1, adhesive is applied at all joint connections. After drying, fabric that has been coated with adhesive is ironed on as patch to prevent damage to the actual covering because of sharp edges.

The dispersion hot-melt adhesive must be thoroughly dry before covering can begin. This process can most certainly be accelerated with a hot air blower that is set for cold air. Hereby, however, attention must be paid that this is actually done with cold air.

The hardening agent is already contained in the dispersion adhesive and reacts with the adhesive starting at a temperature of approximately 50° C. This means that after the process has started, the adhesive hardens and is afterwards no longer suitable for conglutinating the fabric.

Covering the exterior side of the undercarriage is done analogous to the underside. Thereby, attention must be paid that the overlap seam (fabric-fabric) is coated with dispersion hot-melt adhesive prior to covering. To obtain clean seams, they are masked with adhesive tape. The adhesive tape is removed before the adhesive has dried. All joints and apertures are reinforced with a lobed band that is ironed on. Even difficult positions can be processed easily.

The fuselage covering should consist of as few parts as possible so that it has few joints and seams. First, the fuselage underside is covered. Thereby, the fabric must surround the lateral fuselage booms at an angle of approximately 270°. Subsequently, the right fuselage side is fixated outright in one piece at the fuselage with adhesive tape. The structure is transferred to the fabric. The structure outline on the fabric and the fuselage structure are coated with dispersion hot-melt adhesive and left to dry. After that, the fabric is ironed on with the iron from the front to the back. In this way, even difficult positions on the fuselage can be covered with fabric easily.

Exemplary Embodiment 4

Production of a Dispersion Adhesive
Production of a Hardener Solution

To 100 g water, while stirring slowly, 0.7 g dispersant and stabilizing agent, 0.5 g emulsifier and 3.1 g hardening agent on the basis of polyether amine are added. After homogenizing these components, 67 g of the powdery hardening agent on the basis of aliphatic polyisocyanate is dispersed in the solution portion-wise. Thereby, no lumps may be created. The solution is gently stirred up to homogenization.

Mixing of hardener solution into the binding agent 100 g of the binding agent is used, and 0.3 g of the thickener is stirred in. After homogenization, 15 g of the hardener solution is added slowly while stirring.
Conditioning of the Adhesive Solution The adhesive solution is slowly stirred until the forming foam has disappeared. Finally, this adhesive solution is filtered.

REFERENCE NUMBERS

11 Upper side (of an aircraft part that is to be covered)
12 Underside (of an aircraft part that is to be covered)
13 Nose spar
14 End spar
15 Adhesive coating
16 Inner side of fabric
17 Fabric covering of fuselage underside
18 Fabric covering of right side of fuselage
19 Fabric covering of left side of fuselage
20 Fabric covering of upper side of fuselage
21 Fuselage

What is claimed is:

1. A method for covering a light aircraft, comprising:
a) providing a frame system of the light aircraft,
b) providing a single-layered polyester fabric covering, that has a longitudinal shrinkage of about 5-8%, and a horizontal shrinkage of about 4-6%, at 160-180° C.,
c) providing a dispersion hot-melt adhesive comprising a binding agent comprising a polyurethane dispersion and a hardening component comprising polyisocyanates, wherein the hardening component polymerizes after reaching a processing temperature that exceeds 40° C.,
d) coating first and second sections of the fabric covering with the dispersion hot-melt adhesive
e) winding the fabric covering around the frame system in such a way that the first sections of fabric covering contact the frame system and winding the second sections of the fabric covering to create a fabric-fabric-overlap seam of at least two layers on the frame system,
f) ironing the fabric covering to the frame at the first sections and at the second sections, whereby the adhesive polymerizes forming a temperature-stable adhesive connection at the first sections between the fabric covering and the frame system and at the second sections between the at least two layers of the fabric-fabric-overlap seam, such that if the adhesive connection between the fabric covering and frame system is disengaged, the fabric covering is retained on the frame system due to the fabric-fabric-overlap seam.

2. The method of claim 1, wherein the hardening component of the dispersion hot-melt adhesive polymerizes at a processing temperature of 40° to 60° C.

3. The method of claim 1 or 2, wherein the dispersion hot-melt adhesive comprises 80-88% binding agent, 12-15% hardening component and 0.15-0.3% thickener.

4. The method of claim 1, wherein the hardening component comprises 54-60% solvent, 0.35-0.5% stabilizing agent on the basis of a sodium salt of naphthalene sulfonic acid, 0.25-0.35%, emulsifier on the basis of a propoxylated alcohol, 1.7-1.9% hardener on the basis of a polyether amine, and 37-41% polyisocyanate.

5. The method of claim 1, further comprising
g) providing the frame system with a nose spar and an end spar; cutting the fabric covering to include the first sections where the fabric covering overhangs and the second sections where the fabric comes to abut the frame system, the first and second sections including a third section extending a distance A from an edge of the fabric covering, wherein A=π·d·x, where d is a diameter of the nose spar, and x=1.5 to 2.0, and a forth section extending a distance B from an edge of the fabric covering, wherein B=π·d·y, where d is a diameter of the end spar, and y=0.55 to 1.05, and
h) covering an underside of the structural element by surrounding the nose spar approximately 550° to 700° with a first part of the fabric covering that has been coated with adhesive, and the first part is ironed on and subsequently, the end spar, is surrounded approximately 200° to 350° with a second part of the fabric covering that has been coated with adhesive, and the second part is ironed on in the same manner, followed by, i) covering an upper side of the structural element with fabric by surrounding the nose spar approximately 150° to 210° with a third part of the fabric covering that is coated with adhesive and the fabric covering is ironed on, while the end spar is subsequently surrounded less than 0.5 times with a fourth adhesive-coated part of the fabric covering and the fourth adhesive-coated part of the fabric covering is ironed on.

6. The method of claim 1, wherein the fabric covering is subsequently shrunk by being heated to approximately 200° C. once or twice using a hot heat blower at a temperature setting of 280° C. to 380° C., wherein the actual temperature at the fabric is controlled by the distance from the blower.

7. The method of claim 1, wherein prior to being covered with fabric, patches are likewise coated with dispersion hot-melt adhesive and after the adhesive has dried, they are ironed onto rivets and gusset plates to protect the finishing fabric covering.

8. The method of claim 5, wherein the ironing on of covering fabric is done at a temperature of 70° C. to 110° C. for wood designs.

9. The method of claim 5, wherein the ironing on of covering fabric is done at a temperature of 130° C. to 170° C. for metal designs.

10. The method of claim 1, wherein seams are sealed with a lobed band of fabric covering that is coated with a dispersion hot-melt adhesive comprising 80-88% binding agent, 12-15% hardening component and 0.15-0.3% thickener, wherein the adhesive polymerizes at temperatures of >40° C. and is subsequently ironed onto the seam at 60° C. to 100° C.

11. The method of claim 1, wherein an inscription of the surfaces covered with polyester color film occurs via cold adhesion and subsequent ironing at 60° C. to 100° C.

12. The method of claim 1, wherein the fabric covering has a longitudinal shrinkage of 7% and a horizontal shrinkage of 5% at 160-180° C.

13. The method of claim 10, wherein the hardening component comprises 54-60% solvent, 0.35-0.5% stabilizing agent on the basis of a sodium salt of naphthalene sulfonic acid, 0.25-0.35% emulsifier on the basis of propoxylated alcohol, 1.7-1.9% hardener on the basis of a polyether amine, and 37-41% polyisocyanate and is subsequently ironed onto the seam at 60° C. to 100° C.

14. The method of claim 7, wherein the ironing on of covering fabric and/or the patches is done at a temperature of 70° C. to 110° C. for wood designs.

15. The method of claim 7, wherein the ironing on of covering fabric and/or the patches is done at a temperature of 130° C. to 170° C. for metal designs.

16. The method of claim 6, wherein the temperature setting of the hot heat blower is 280° C. to 350° C.

17. The method of claim 1, wherein the frame system comprises a nose spar or end spar which are covered with said polyester fabric covering.

18. The method of claim 1, wherein the polyester fabric covering is single-layered in all regions where no fabric-fabric overlap exists.

19. The method of claim 1, further comprising shrinking the fabric covering longitudinally by 5-8%, and horizontal by 4-6%, at 160-180° C.

20. The method of claim 1, wherein the frame system of the light aircraft comprises a nose spar, and an end spar, and wherein the frame system of the light aircraft further comprises an upper side and an under side and the fabric covering is wound around the frame system such that at the upper side and underside of the frame system the fabric covering is a single layer fabric and the fabric covering at the nose and end spars is multilayered due to the winding.

21. The method according to claim 1, wherein the frame system comprises a first and second spar and the fabric covering is wound around the first spar and the second spar such that the second sections of the fabric covering create fabric-fabric-overlap seams of at least two layers on the spars, and the ironing at the second sections forms a temperature-stable adhesive connection between the layers of the fabric-fabric-overlap seams such that the fabric covering is retained on the frame system due to the fabric-fabric-overlap seams.

22. The method of claim 1, wherein the hardening component is based on a polyetheramine.

* * * * *